Nov. 29, 1966     L. J. BINTZ     3,287,899
AIR POLLUTION CONTROL SYSTEM FOR INTERNAL COMBUSTION ENGINE
Filed Feb. 12, 1965     3 Sheets-Sheet 1
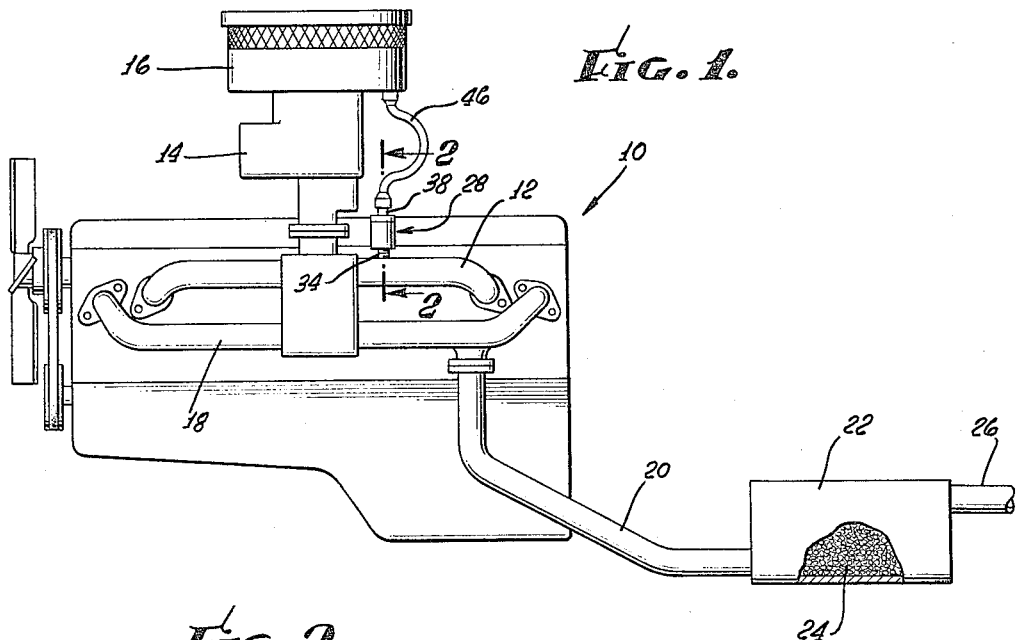
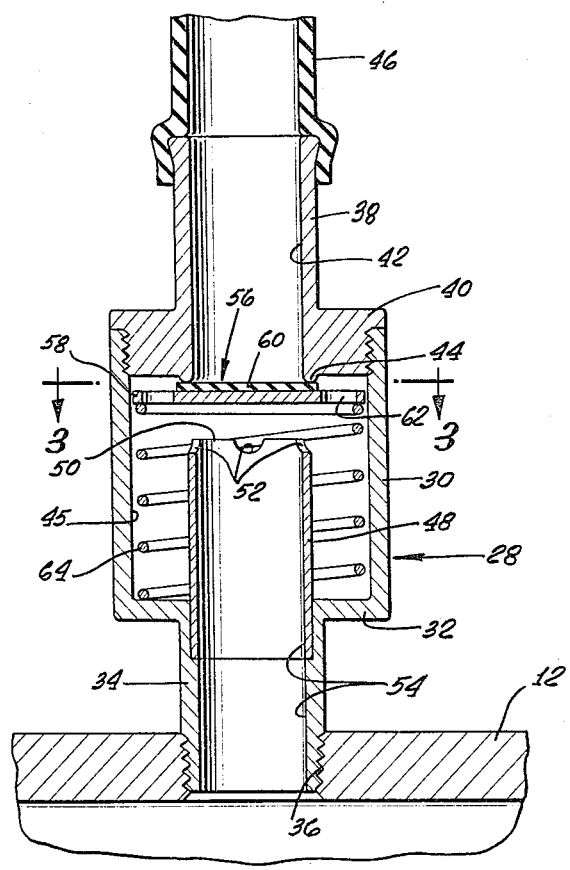
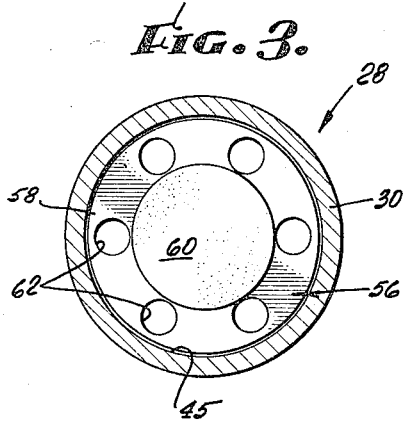
INVENTOR.
LOUIS J. BINTZ
by Huebner & Worrel
ATTORNEYS.

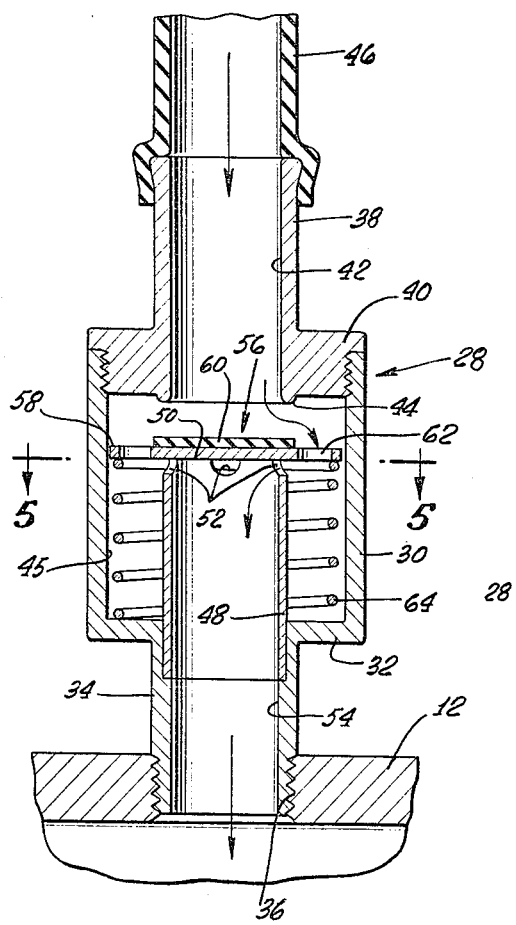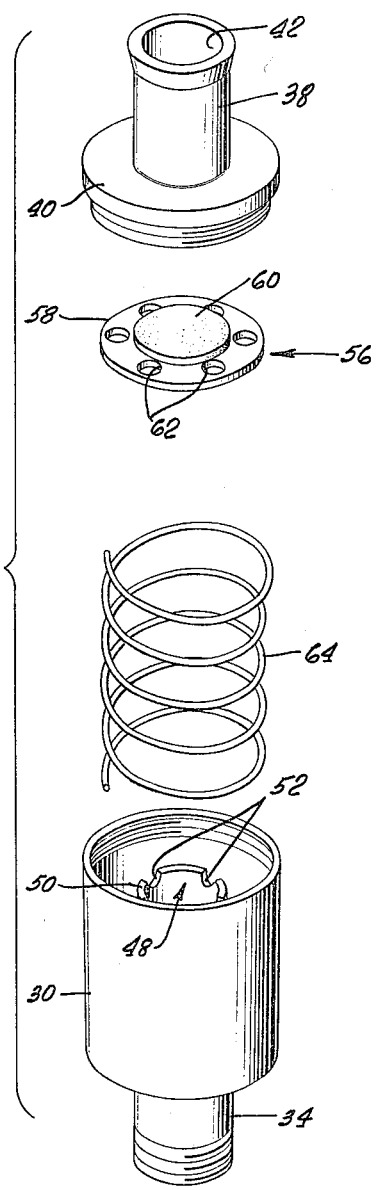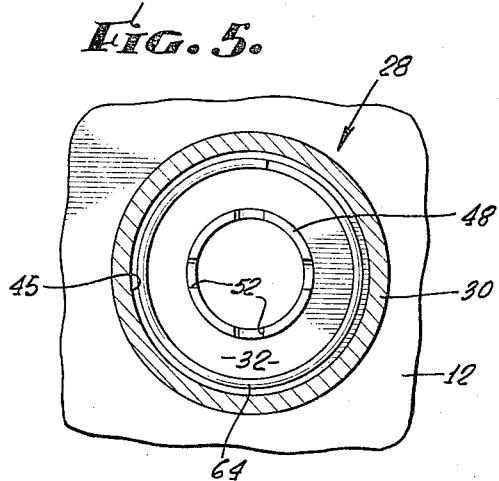

Nov. 29, 1966 L. J. BINTZ 3,287,899
AIR POLLUTION CONTROL SYSTEM FOR INTERNAL COMBUSTION ENGINE
Filed Feb. 12, 1965 3 Sheets-Sheet 3
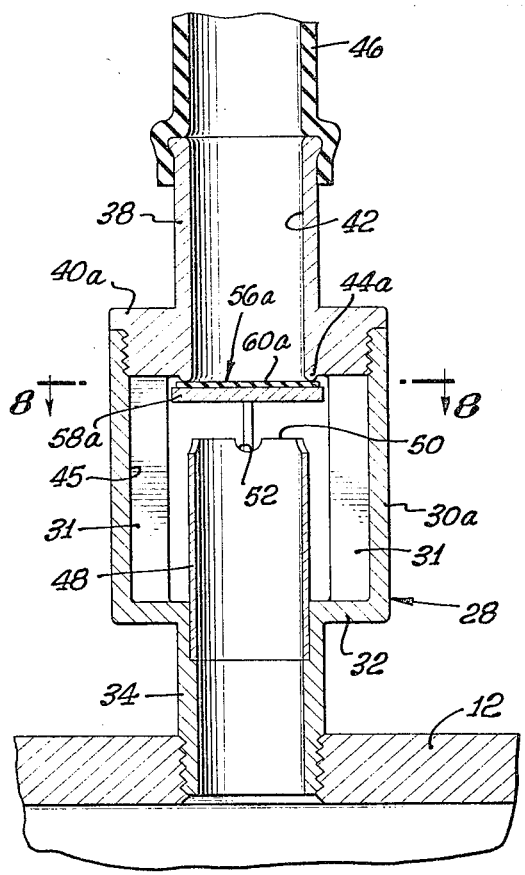
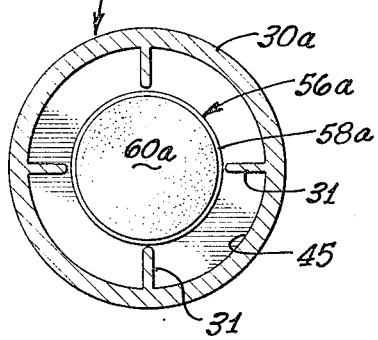
INVENTOR.
LOUIS J. BINTZ
BY Huebner & Worrel
ATTORNEYS.

United States Patent Office 3,287,899
Patented Nov. 29, 1966

3,287,899
AIR POLLUTION CONTROL SYSTEM FOR
INTERNAL COMBUSTION ENGINE
Louis J. Bintz, Placentia, Calif., assignor to Norris-Thermador Corporation, Los Angeles, Calif., a corporation of California
Filed Feb. 12, 1965, Ser. No. 432,302
3 Claims. (Cl. 60—30)

The present invention relates generally to apparatus for reducing the emission of "smog"-forming and other harmful internal combustion engine exhaust emissions, and the invention relates more particularly to an air pollution control system for an internal combustion engine which comprises a novel combination of a catalyst bed in the exhaust conduit and means for supplying air to the catalyst from the intake system of the engine, the combination being simple, inexpensive, long-lasting and efficient.

A number of different types of apparatus have been developed and suggested for reducing harmful exhaust emissions from the engines of automobiles, trucks and buses, such as unburned or partially burned hydrocarbons and carbon monoxide. Probably the most effective systems are those which embody a bed of catalytic material in the exhaust conduit, usually in the form of a catalytic muffler, with some means for injecting air into the exhaust conduit upstream of the catalyst bed. The usual air injection means is an air pump driven by the fan belt or by the electrical system for the engine. Such air pumps or other air injection devices presently used are relatively expensive, are subjected to considerable wear during operation, and are likely to become damaged or destroyed in the event hot exhaust gases back up thereinto. Also, conventional catalytic muffler systems having air injection devices require that the air be introduced into the exhaust system during all modes of engine operation, and it is very difficult to modulate the flow of air added to the exhaust system so as to provide the required amount of added air for the various modes of operation.

In view of these and other problems in the art, it is an object of the present invention to provide a novel air pollution control system associated with an internal combustion engine which comprises a catalyst bed in the exhaust system of the engine, and air supply valve means connected to the intake system of the engine and responsive to intake manifold vacuum so as to be open during deceleration and closed during other modes of engine operation, the valve means supplying an excess of air for storage of oxygen in the catalyst during deceleration, and this oxygen being utilized in the catalytic oxidation of pollutants in the exhaust stream during the other modes of engine operation.

Another object of the invention is to provide a novel system of the character described which is particularly simple, eliminating the need for the usual air pump, and which is efficient for the reduction of unburned or only partially burned exhaust ingredients to values well within the acceptable limits set by state legislatures and accepted by the industry.

Another object of the invention is to provide a system of the character described which is not required to provide varying amounts of air for various modes of engine operation, but is simply required to provide substantial amounts of air during the deceleration mode of operation.

A further object is to provide apparatus of the character described which requires no special engine tune-up as is required in some air pollution systems for internal combustion engines, which is inexpensive and which can be installed without difficulty.

Briefly, the invention is an internal combustion engine system for controlling undesired or harmful emissions of unburned or partially burned hydrocarbons, carbon monoxide and the like, which combines a catalyst bed, usually embodied in a catalytic muffler, with means for supplying added air in the exhaust stream to assist the catalyst in oxidizing the undesired exhaust ingredients. A catalyst material is provided which has the capacity for oxidation-reduction cycling, i.e., for taking on substantial quantities of oxygen when there is an excess of air or oxygen in the exhaust stream and supplying this added oxygen to the catalytic reaction when there is a deficiency of air or oxygen in the exhaust stream. In combination with this type of catalyst bed, air is supplied to the system by means of a valve device connected to the intake system of the engine which supplies added air only during the deceleration mode of operation of the engine, in sufficient quantity so that a substantial excess of air passes through the engine cylinders and out into the exhaust stream, so that this added air can be taken up by the catalyst. The deceleration mode is one in which there is a low volume of flow of exhaust gases through the exhaust system, so that the air added at that time need not be in large quantity to constitute a relatively large percentage of the exhaust stream, and this makes the added air readily available to the catalyst as the exhaust stream flows through the catalyst bed. The valve device operates in response to intake manifold vacuum, being biased so as to remain closed to prevent the introduction of atmospheric air until the intake manifold vacuum rises to a high value produced only during deceleration, i.e., about 22 or 23 inches of mercury, at which time pressure differential between atmospheric and intake manifold pressure will cause the valve to open. Opening of the valve results in increased effect of atmospheric pressure tending to open the valve, or alternatively results in a lessening of the biasing force tending to close the valve, whereby the valve element will remain open during the major portion of the deceleration cycle, even as the manifold vacuum becomes substantially reduced, until the throttle is advanced or deceleration has substantially terminated, at which time the valve element will again be closed by the biasing means and will remain closed during all other modes of engine operation until there is another deceleration cycle.

Further objects and advantages of the present invention will appear during the course of the following part of the specification, wherein the details of construction and mode of operation of a presently preferred embodiment are described with reference to the accompanying drawings, in which:

FIGURE 1 is a side elevation view illustrating an internal combustion engine embodying a catalytic muffler and a deceleration valve associated with the intake manifold in accordance with the present invention.

FIGURE 2 is an enlarged, axial section through the deceleration valve employed in the invention, and taken on the line 2—2 in FIGURE 1, with the deceleration valve shown in its fully closed position.

FIGURE 3 is a transverse section through the deceleration valve taken on the line 3—3 in FIGURE 2.

FIGURE 4 is an axial section similar to FIGURE 2, but showing the deceleration valve in its fully opened position.

FIGURE 5 is a transverse section taken on the line 5—5 in FIGURE 4.

FIGURE 6 is an exploded view showing the various parts of the deceleration valve in perspective.

FIGURE 7 is an axial section similar to FIGURE 2, illustrating a form of the invention which embodies magnetic biasing means instead of the spring biasing means of FIGURES 2 to 6.

FIGURE 8 is a transverse section taken on the line 8—8 in FIGURE 7.

Referring to the drawings, and at first particularly to FIGURE 1 thereof, the invention is illustrated in association with an internal combustion engine 10 having an intake system comprising intake manifold 12, carburetor 14 connected to the intake manifold, and the usual air cleaner or filter unit 16 attached to the carburetor. The engine 10 has an exhaust system comprising exhaust manifold 18 from which an exhaust pipe 20 extends, catalytic muffler 2 connected to the exhaust pipe 20 and having a bed 24 of catalyst material therein, and tail pipe 26 connected to the catalytic muffler 22 and through which the exhaust gases are released to the atmosphere.

The presently preferred deceleration valve 28 of the present invention has a generally cylindrical housing or body 30 which is inwardly flanged at one end to provide an end wall 32 from which an outlet connector 34 extends. The outlet connector 34 is externally threaded for engagement within a threaded opening 36 which extends through the wall of the intake manifold 12. If desired, the valve may be connected elsewhere to the intake system at a point having a vacuum condition generally following that of the intake manifold, as for example to the connection between the carburetor and the intake manifold, or to the carburetor itself downstream of the throttle valve.

At the other end of the valve housing or body 30 is inlet connector 38 which is provided with an external flange 40 that is threadedly connected to the housing or body 30. Inlet connector 38 has an internal bore defining inlet conduit 42 which terminates at a valve seat 44 that projects somewhat into the valve chamber 45 within the housing 30. Clean air is supplied to the valve by means of hose 46 which is connected at one end to the inlet connector 38 and at its other end to the air cleaner or filter unit 16.

Projecting into the valve chamber 45 from the outlet connector 44 is valve outlet nozzle 48 having its inner end 50 provided with a plurality of notches 52 which determine the maximum rate of air flow through the valve into the intake manifold when the valve is in its fully opened position. Outlet connector 34 and nozzle 48 together define the outlet conduit 54 from the valve chamber 45 to the intake manifold 12.

Floatingly positioned within the valve chamber 45 between valve seat 44 and nozzle end 50 is the valve element 56, which is generally in the form of a disc-shaped wafer. The valve element 56 comprises disc 58 which is slightly smaller in diameter than the inside diameter of the valve housing 30 so as to move freely in an axial direction within the housing but to be centered by the housing. Centrally affixed to the upstream or atmospheric side of the disc 58 is a disc-shaped pad 60 of rubber, neoprene or other resilient sealing material, the pad being engageable against the valve seat 44 is sealing engagement therewith when the valve is closed. A plurality of peripheral openings 62 are provided through the peripheral portion of the disc 58 to permit the flow of atmospheric air past the valve element 56 when the valve is in its open position as shown in FIGURE 4. The valve element 56 is biased toward its closed position as shown in FIGURE 2 by means of a coil compression spring 64 engaged between the body end wall 32 and the valve element 56. Other suitable biasing means may be employed, such as magnetic biasing means, without departing from the invention.

It will be seen from FIGURE 2 that when the valve element 56 is in its seated position against the valve seat 44 atmospheric pressure is only permitted to operate over the limited area of the valve pad 60 that is circumscribed by the valve seat 44. The biasing means, in this case spring 64, is selected to have a force sufficient to hold the valve element in the closed position of FIGURE 2 until the intake manifold vacuum reaches about 22 or 23 inches of mercury, which only occurs during deceleration, at which time the pressure differential across the valve element 56 between atmospheric pressure and intake manifold pressure will be sufficient to overcome the closing force of the spring and the valve element will move off of the valve seat 44. Once such movement has occurred, the effective area over which the atmospheric pressure operates on the valve element suddenly increases to the entire area of the valve element, so that the instant the valve is open there is a greater force opposing the spring and the valve will move to its fully opened position as shown in FIGURE 4 and tend to stay there. The valve element will then stay in its open position even though the intake manifold vacuum is reduced from the initial value of about 22 or 23 inches of mercury down to about 15 inches of mercury or slightly less. By this means, the gradual deceleration of the vehicle to slower speeds and the consequent reduction in intake manifold vacuum will still not permit the valve to close, so that the added air will be continuously introduced into the intake manifold from the atmosphere (via the air filter unit 16, hose 46 and valve 28) over an extended deceleration cycle.

However, the relative dimensions of the area encompassed within the valve seat 44, the over-all area of the valve element 56 and the force of the spring 64 are selected so that once the vehicle has slowed down sufficiently during the deceleration for the intake manifold vacuum to be reduced to about 10 or 15 inches of mercury, the force of spring 64 will again overcome the force resulting from the pressure differential on the valve element 56 and the valve element will be moved to its closed position as shown in FIGURE 2. Also, if the valve is open during a deceleration cycle, as soon as the throttle is advanced from its closed position the consequent raising of intake manifold pressure (i.e., reduction in intake manifold vacuum) will decrease the pressure differential across the valve element 56 to permit instantaneous closing of the valve by the spring 64.

The maximum rate of flow of air through the valve 28 is controlled by the size of the notches 52 at the inner end of the outlet nozzle 48 rather than by the size of the valve element openings 62, to prevent the valve element from being held too long or in effect locked in its open position by the flow of air through the valve.

If magnetic biasing means is used for urging the valve element toward its seat the biasing force will be greatest when the valve is closed and will decrease as the valve element moves away from the valve seat toward the open position of the valve. Accordingly, with magnetic biasing means the valve can be designed to open only at high vacuum during deceleration, and will remain open during the deceleration cycle due to the reduced biasing force resulting from opening of the valve, and the valve will again close when the vacuum reaches a preselected low value; but the valve will not open during other modes of engine operation. In this case it is not necessary to provide added atmospheric pressure area by unmasking part of the valve element when it opens as with spring biasing.

Such magnetic biasing means is illustrated in FIGURES 7 and 8, wherein both the valve seat 44a and the disc 58a of the valve element 56a are composed of magnetic material, with one of them permanently magnetized to establish the magnetic biasing force Sealing of the valve is accomplished in the closed position thereof by resilient sealing pad 60a. The valve housing 30a below its connection with flange 40a is provided with internal longitudinally arranged, circumferentially spaced ribs 31 which retain the valve element 56a in axial alignment with the outlet nozzle 48, which in this form of the invention is composed of non-magnetic material.

Such magnetic biasing may be provided by making both the valve seat and valve element of magnetic material commonly referred to as ferromagnetic, with at least one of these two members being magnetized, so that the valve element is magnetically biased toward its closed position.

The deceleration mode of operation for an internal combustion engine normally involves the flow of too rich a mixture through the engine cylinders for adequate combustion, so that there is normally a relatively large output to the exhaust system of unburned or only partially burned hydrocarbons during deceleration. The applicant has found that if the deceleration valve 28 is set to admit about 3 cubic feet per minute of added air to the intake manifold during deceleration for an automobile engine of average size, then there is more efficient burning in the engine cylinders, but there is very little added air for the catalyst to take on, so that the over-all tail pipe emissions during weighted cycle tests at various modes of operation (to represent normal vehicle use) results in a substantial increase in tail pipe emissions due to poor operation of the catalyst.

According to the present invention, the deceleration valve 28 is preferably arranged to admit from about 5 to about 12 cubic feet per minute of air into the intake manifold, the value varying in this range for engines of different sizes, with an optimum of about 7 cubic feet per minute. This is much more added air than can be utilized for combustion in the engine cylinders, and therefore provides a substantial amount of added air which passes on through the cylinders, exhaust manifold and exhaust pipe to the catalyst bed for storage in the bed during the deceleration mode. The applicant has found that when the added air is within this range of from about 5 to about 12 cubic feet per minute, the combustion efficiency within the cylinders is approximately what it would have been without any added air, because there is too much air for a good combustible mixture. However, now there is a greatly increased over-all efficiency of operation of the catalytic muffler, so that the emissions are relatively low in weighted cycle tests involving all modes of operation. For example, in weighted cycle tests the California State Legislature requirement is that the average emissions be within 275 parts per million of hydrocarbons. Employing the present invention on a vehicle having about 70,000 miles on the odometer, and of about average tune and average upstream emission content, the exhaust emissions averaged only about 165 parts per million of hydrocarbons. Further, it was found that the efficiency of operation of the system was just as good at 4,400 miles of operation of the catalyst bed as it was at 1,000 miles of operation of the catalyst bed. This is attributed to the fact that the catalyst is subjected to a successive oxidation and reduction cycling which helps to maintain it at peak operating efficiency, the catalyst being oxidized during the deceleration mode when the added air is injected into the system, and being reduced during the other modes when the catalyst is causing oxidation of previously unoxidized or only partially oxidized exhaust ingredients.

While the presently preferred range for the air flow through valve 28 during deceleration is from about 5 to about 12 cubic feet per minute, it has also been found satisfactory by the applicant to employ any amount of air flow through the valve 28 above about 5 cubic feet per minute. While flow rates above about 12 cubic feet per minute tend to substantially decrease the burning efficiency in the cylinders during deceleration so that it is poorer than without any introduction of air into the intake manifold, nevertheless the over-all efficiency of the system in reducing undesired emissions from the exhaust system into the atmosphere is substantially greater than without the system because of the proper addition of air to the catalyst bed.

Any suitable catalyst may be employed in the catalyst bed 24 which is capable of oxidation-reduction cycling; i.e., has the characteristic that it will take on and store oxygen when there is an abundance of oxygen in the exhaust stream (when the exhaust stream constitutes an oxidizing atmosphere) and will give off the oxygen to the reaction when there is insufficient oxygen in the exhaust stream (when the exhaust stream constitutes a reducing atmosphere). Preferred active catalytic materials having this characteristic are oxides of multi-valent metals, including oxides of such multi-valent metals as iron, chromium, copper, cobalt, manganese, molybdenum, nickel, platinum, palladium and vanadium. The platinum and palladium are also effective in their metallic form. Any one or a combination of these active catalytic materials may be employed. Thus, for example, an excellent catalyst for the present purpose is a combination of ferric oxide, chromic oxide and copper oxide. Such active catalytic materials are preferably impregnated into at least the surface regions of suitable base or support particles having porous, clay-like surface characteristics. Typical base particles which may be impregnated with the active catalyst materials are kaolin as processed by Minearls & Chemicals, and commercially available in spheres called "Kaospheres," this material being practically pure kaolin (45% $Al_2O_3$, 55% $SiO_2$); extruded "Celite" pellets as made by Johns Manville, this being diatomaceous earth which is substantially pure silicon oxide in porous form; or a porous bauxite, such as pellets comprised of an agglomeration of fine bauxite particles.

It is to be understood that the foregoing examples of active catalyst materials and of base or support particles therefor are given by way of illustration only, and not of limitation.

While the instant invention has been shown and described herein in what is believed to be the most practical and preferred embodiment, it is recognized that departures may be made therefrom within the scope of the invention, which is therefore not to be limited to the details disclosed herein but is to be accorded the full scope of the claims.

What I claim is:

1. An air pollution control system for an internal combustion engine which comprises a catalyst bed disposed in the exhaust system of the engine and comprising active catalytic material of the type capable of oxidation-reduction cycling, and air supply valve means connected to the intake system of the engine and responsive to intake manifold vacuum so as to be open during the deceleration mode of engine operation and closed during the other modes of engine operation, said valve means supplying air to the intake system in excess of engine combustion requirements so as to supply oxygen to the catalyst during deceleration, and the catalyst releasing the oxygen for catalytic oxidation of exhaust ingredients during the other modes of engine operation, said valve means comprising a valve element movable between a closed position and an open position and means normally biasing the element to its closed position, the valve element being arranged so that the pressure differential between atmospheric and intake manifold pressures exerts a force opposing said biasing means and tending to open the valve, said pressure differential force exceeding the force of the biasing means to open the valve when the intake manifold vacuum reaches a high value during deceleration, but being insufficient to move the element from its closed position during other modes of engine operation, a portion of the valve element being masked off from atmospheric pressure in its closed position, said portion being exposed to atmospheric pressure when the valve element moves out of the closed position toward the open position so as to increase said pressure differential force, whereby once the valve is opened at a high intake manifold vacuum during deceleration it will remain open during a substantial portion of the deceleration cycle despite a substantial reduction of the intake manifold vacuum.

2. A system as defined in claim 1, wherein said biasing means comprises spring biasing means.

3. An air pollution control system for an internal combustion engine which comprises a catalyst bed disposed in the exhaust system of the engine and comprising active catalytic material of the type capable of oxidation-reduction cycling, and air supply valve means connected to the intake system of the engine and responsive to intake manifold vacuum so as to be open during the deceleration mode of engine operation and closed during the other modes of engine operation, said valve means supplying air to the intake system in excess of engine combustion requirements so as to supply oxygen to the catalyst during deceleration, and the catalyst releasing the oxygen for catalytic oxidation of exhaust ingredients during the other modes of engine operation, said valve means comprising a valve element movable between a closed position and an open position and means normally biasing the element to its closed position, the valve element being arranged so that the pressure differential between atmospheric and intake manifold pressures exerts a force opposing said biasing means and tending to open the valve, said pressure differential force exceeding the force of the biasing means to open the valve when the intake manifold vacuum reaches a high value during deceleration, but being insufficient to move the element from its closed position during other modes of engine operation, said biasing means comprising magnetic biasing means which exerts its maximum biasing force when the valve element is proximate its closed position, with the biasing force diminishing as the valve element moves toward its open position, whereby once the valve is opened at a high intake manifold vacuum during deceleration it will remain open during a substantial portion of the deceleration cycle despite a substantial reduction of the intake manifold vacuum.

References Cited by the Examiner

UNITED STATES PATENTS 1,977,518   10/1934   Mallory _____ 123—119
2,288,943   7/1942   Eastman.

MARK NEWMAN, *Primary Examiner.*

RALPH D. BLAKESLEE, *Examiner.*